(12) United States Patent
Shamsoddini et al.

(10) Patent No.: US 11,593,058 B2
(45) Date of Patent: Feb. 28, 2023

(54) PORTABLE AUDIO DEVICE CASE WITH POWER-SAVING FEATURES

(71) Applicant: Logitech Europe S.A., Lausanne (CH)

(72) Inventors: Ahmad Shamsoddini, Cupertino, CA (US); Jeremy Saxton, Draper, UT (US); Hamidreza Niknami, Fremont, CA (US); John Chen, San Ramon, CA (US); Guillaume Mathias, Midway, UT (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/915,561

(22) Filed: Jun. 29, 2020

(65) Prior Publication Data

US 2021/0405957 A1    Dec. 30, 2021

(51) Int. Cl.
*G06F 3/16* (2006.01)
*H04R 1/10* (2006.01)

(52) U.S. Cl.
CPC ........... *G06F 3/162* (2013.01); *H04R 1/1041* (2013.01); *H04R 2420/07* (2013.01); *H04R 2460/03* (2013.01)

(58) Field of Classification Search
CPC .... H04R 25/65; H04R 25/652; H04R 25/658; H04R 25/604; H04R 25/60; H04R 25/602; H04R 25/556; H04R 2225/31; H04R 2225/61; H04R 2460/03; H04R 5/033; H04R 5/04; H04R 1/1041; H04R 1/1016; H04R 2420/07; G06F 3/162
USPC .......................................... 381/74, 322, 323
See application file for complete search history.

(56) References Cited

U.S. PATENT DOCUMENTS

| | | | |
|---|---|---|---|
| 2016/0041808 A1* | 2/2016 | Pelland | H04R 3/00 381/123 |
| 2018/0091887 A1* | 3/2018 | Minoo | H04R 1/1025 |
| 2018/0358934 A1* | 12/2018 | Balasundaram | H03F 3/45475 |
| 2021/0160618 A1* | 5/2021 | Chun | G10L 21/003 |

* cited by examiner

*Primary Examiner* — Ahmad F. Matar
*Assistant Examiner* — Sabrina Diaz
(74) *Attorney, Agent, or Firm* — Kilpatrick Townsend & Stockton LLP (57) ABSTRACT

Disclosed are techniques to improve power consumption of portable audio devices through the use of a plurality of adapters. Each of the plurality of adapters can be used to modify and/or enhance the functionality of the portable audio device. The portable audio device can include respective circuitry that is activated in response to detecting that a specific one of the plurality of adapters is coupled to the portable audio device.

19 Claims, 3 Drawing Sheets

FIG. 3

PORTABLE AUDIO DEVICE CASE WITH POWER-SAVING FEATURES

BACKGROUND

Portable audio devices, such as headphones and earbuds, are becoming increasingly common. Many such devices are wireless and can be battery operated. True wireless earbuds, for example, may be used in conjunction with a corresponding case with an integrated battery for charging the earbuds. As these devices become increasingly popular, there is a desire to increase their functionality by enabling them to interface with various types of audio sources. However, this functionality must be balanced by impacts to the battery life required to power these devices.

BRIEF SUMMARY

Disclosed is a system that can include a portable audio device, a plurality of different physical interface adapters, and a portable audio case. The portable audio device can include a first housing; a transducer coupled to the first housing; a first power storage element coupled to the first housing; a first wireless transceiver coupled to the first housing; and a first one or more processors coupled to the transducer, the power source, the first wireless transceiver, and the first housing. The one or more processors can be configured to receive a wireless transmission via the first wireless transceiver and output soundwaves via the transducer corresponding to the wireless transmission.

The plurality of different physical interface adapters can each be configured to couple to a respective one of a plurality of different types of audio sources. The portable audio case can include a housing including one or more receptacles configured to physically receive and couple to the portable audio device; a second power storage element coupled to the housing; an interface port coupled to the housing, the interface port configured to couple the portable audio case to each of the plurality of different physical interface adapters; mode-specific circuitry coupled to the housing and the interface port; a second wireless transceiver coupled to the housing and the interface port; and a second one or more processors coupled to the housing, the second power storage element, the interface port, and the second wireless transceiver.

The second one or more processors can be configured to detect that a certain one of the plurality of different physical interface adapters is coupled to the interface port. In response to detecting that the certain physical interface adapter is coupled to the interface port, the second one or more processors can configure the case to enter a first operational state wherein the mode-specific circuitry either is powered on or enters a high-power state to support receiving an audio signal via the certain physical interface adapters. The second one or more processors can further be configured to detect, using the mode-specific circuitry, that an audio signal is received from one of the plurality of different types of audio sources via the certain physical interface adapter.

In response to detecting that the audio signal is received from one of the plurality of different types of audio sources via the certain physical interface adapter, the second one or more processors can be configured to send a command, via the second wireless transceiver to the first wireless transceiver, wherein, in response to receiving the command, the first one or more processors receive streaming audio via the first wireless transceiver from the second wireless transceiver, the streaming audio corresponding to the audio signal and outputting a corresponding soundwave via the transducer.

The disclosed techniques can include methods and devices pertaining to a portable audio case. The portable audio case can include a housing including one or more receptacles configured to physically receive and couple to one or more portable audio devices; a power storage element coupled to the housing; an interface port coupled to the housing, the interface port configured to couple the portable audio case to a plurality of audio sources via a respective different physical interface adapter; a transmitter coupled to the housing and the interface port; and one or more processors coupled to the housing, the power storage element, the interface port, and the transmitter.

The one or more processors can be configured to detect whether a certain physical interface adapter is coupled to the interface port to receive an audio signal from a certain type of audio source of the plurality of audio sources. In response to detecting that the certain physical interface adapter is coupled to the interface port, the one or more processors can be configured to configure the case to enter a first operational state wherein mode-specific circuitry is enabled that supports receiving the audio signal from the certain type of audio source and wirelessly transmitting audio data via the transmitter wherein the audio data corresponds to the audio signal.

The first operational state can include an increased steady-state power consumption rate from the power storage element to support receiving the audio signal and transmitting the audio data. The first operational state can include powering digital signal processing circuitry of the one or more processors, the signal processing circuitry configured to support processing of the audio signal. The first operational state can include powering circuitry configured to receive audio at a higher bit width and/or a higher sampling rate than the portable audio case would be able to receive if the circuitry were not powered. The audio signal can be an analog audio signal, and the audio data is digitally encoded. The one or more processors can further be configured to support a second operational state in response to the one or more processors detecting that the audio signal is being received from the certain type of audio source.

The second operational state can include remapping one or more input elements of a portable audio device coupled to the portable audio case. The second operational state can include sending a command to a portable audio device coupled to the portable audio case wherein the command configures the portable audio device to receive the audio data wirelessly transmitted from the portable audio case. The first operational state can include an increased steady-state power consumption rate from the power storage element to support receiving the audio signal and transmitting the audio data. The second operational state can include sending a first command, via the transmitter, the first command configured to cause the one or more portable audio devices to switch audio output by the one or more portable audio devices to correspond to the audio signal received from the certain type of audio source. The second operational state can include sending a second command, via the transmitter, the second command configured to cause the one or more portable audio devices to receive wireless audio streaming data from the wireless transmitter of the case from a different wireless transmitter.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The detailed description is set forth with reference to the accompanying figures.

In the appended figures, similar components and/or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Disclosed are techniques to improve the power consumption of audio devices. The audio devices can include headphones and earbuds (in-ear monitors, over-the-ear monitors, etc.), including true wireless earbuds. The audio devices can be used in conjunction with a corresponding case that can include an internal power source to charge the audio devices and can include additional features as disclosed herein.

For example, the case can include a wireless transmitter to wirelessly transmit audio to the corresponding headphones or earbuds. The case may also include one or more adapters that can be used to couple the case to a respective type of audio source. For example, the audio source may be an analog audio source, a digital audio source, a wireless audio source, or other, each requiring a different adapter. Note that there may be digital or analog audio sources, each requiring a different adapter dictated by the physical connection needed to couple to the source to obtain the digital or analog audio signal.

As disclosed herein, the case may also include circuitry to adapt to different adapters and/or respective audio sources through the use of different operating modes. Each of these operating modes may include applying power to a different set of one or more circuits of the case in order to optimize power consumption of the case according to its current use. For example, some circuits may only be powered on when needed when a certain adapter or audio source is detected as being coupled to the case. Certain operating modes may include switching operational parameters, such as selected audio source(s), audio processing parameter(s), or audio mixing setting(s).

Figure 1:
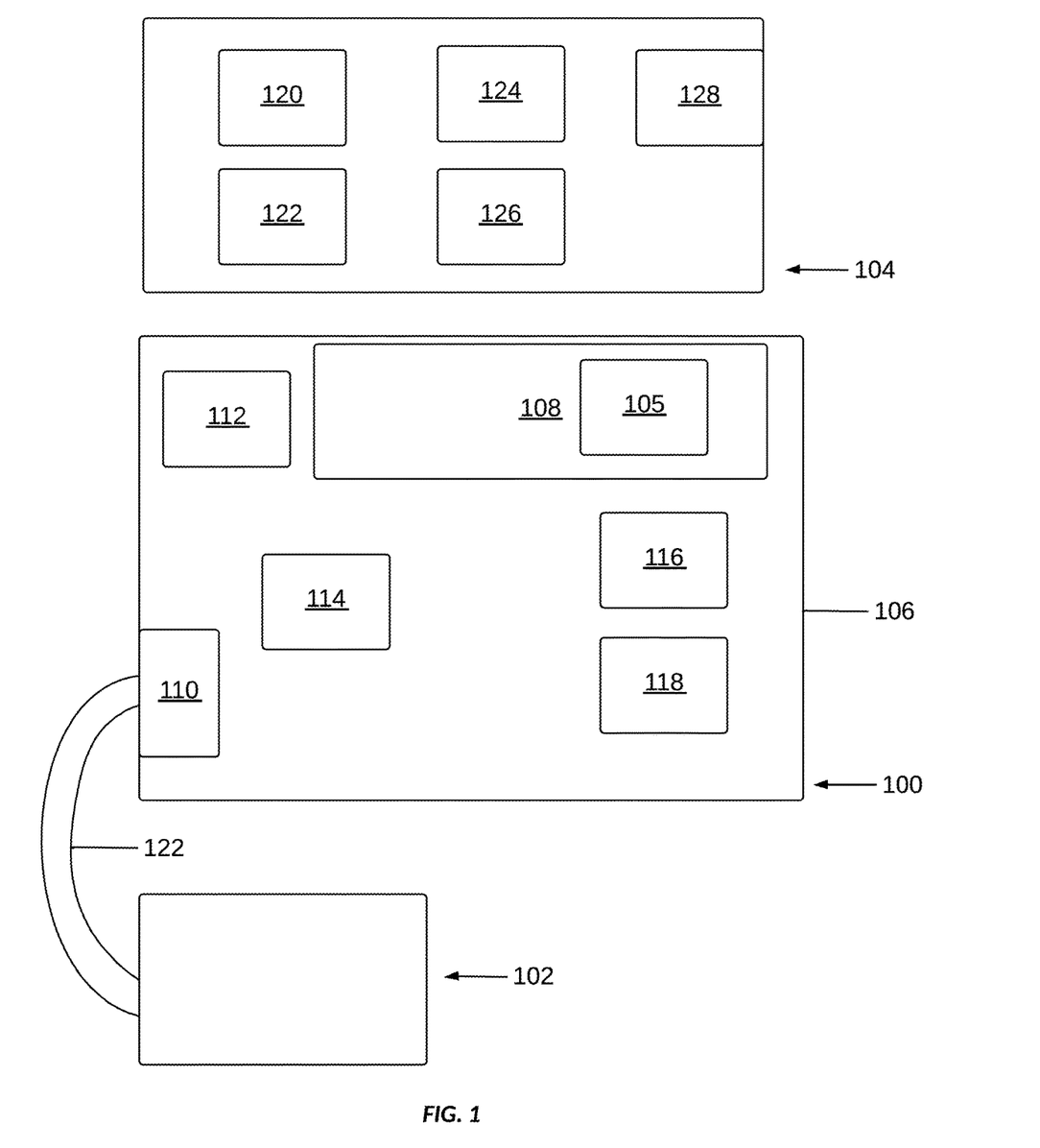
FIG. 1 shows a notional portable audio system according to certain techniques of the disclosure.

FIG. 1 illustrates a portable audio device case 100 and a corresponding portable audio device 104. Portable audio device 104 can be a headphone device, earbud device, true wireless earbud device, or other. Case 100 can be a case to store audio device 104 and/or otherwise couple to audio device 104. Illustrated is a portable audio device 105 (which can be similar to audio device 104 and include similar functionality). For example, audio devices 104 and 105 may be respective left and right true wireless earbud devices wherein each includes a battery 120, adapter 122, wireless transceiver(s) 124, and/or audio driver(s) 126. In conjunction, audio devices 104 and 105 may receive wireless audio from an external source (through use of wireless transceiver(s) 124) and respectively output a left or right channel of audio using audio driver(s) 126. Alternatively, audio device 104 may itself include audio driver(s) 126 to output a left and right channel. Any number of channels is contemplated as being able to be output by audio device 104 and/or audio device 105 using physical audio driver(s) 126 and/or virtual audio divers/sources.

Case 100 can include a receptacle 108 to accept audio device 104 and/or audio device 105. As illustrated, audio device 105 can be coupled to receptacle 108. When an audio device is coupled to receptacle 108, the coupling can be mechanical and/or electrical. For example, pogo pins may be used to electrically couple to an audio device and enable electrical power and/or signals to flow therebetween. The coupling can also include a mechanical coupling for storage of the audio device, which may protect it from an external environment. Receptacle 108 may be located within an internal cavity of case 100 and may be accessed using a lid that can be opened or closed to access receptacle 108 through the housing 106 of case 100. Alternatively, receptacle 108 may be open to be externally accessed by inserting an audio device into receptacle 108. The audio device, when inserted into the receptacle, may be secured by mechanical or magnetic means, for example, and may form part of a continuous external contour defined by case 100.

Case 100 may also include wireless transceiver(s) 112, power source(s) 114, an interface port 110, processor(s) 116, and mode-specific circuitry 118. Adapter 122 can be used to couple interface port 110 of case 100 with audio source 102. Although not illustrated, audio source 102 may be one of several types of audio sources, each requiring a different adapter (such as adapter 122). Each adapter may include a different physical connection on one end to attach to audio source 102. Each adapter may include a similar or same physical connection to couple with interface port 110 of case 100. For example, interface port 110 may couple to adapter 122 through use of a universal serial bus type-C (USB-C) or other port. Through use of this system, a common interface port 110 can be used to couple case 100 to several types of audio sources 102 using different adapters 122.

Examples of adapter 122 can include an adapter for use with an analog audio source, such as a cellular phone, airplane entertainment system, or home stereo, etc. The physical interface may be an audio jack, such as a tip-ring-sleeve connector (a 3.5 mm audio jack is a common example) to couple to the analog source. One or more audio channels may be received via this adapter. Adapter 122 can be a cable with passive (resistors, capacitors, inductors, etc.) and/or active (integrated circuits, transistors, etc.) electronic components.

Another adapter may be a digital interface adapter that may couple case 100 to a digital audio source. For example, such an adapter may include a USB-A connector to couple to a PC or other audio source. A micro-USB or USB-C connector may also be used to couple to a cellular phone, tablet computer, etc. Case 100 may be recognized as an external digital audio device to the digital audio source, as will be further disclosed herein. An adapter, such as adapter 122, can include any number or combination of analog or audio paths and/or other communication paths. For example, an adapter may include an analog audio channel, a digital audio channel, and a digital communication channel. In certain embodiments, adapter 122 may be a wireless adapter to couple case 100 wirelessly to an audio source.

Power source(s) 114 may include a battery and/or a capacitor and be used to power components of case 100 (such as processor(s) 116 and mode-specific circuitry 118). Power source(s) 114 may also provide power to audio devices 104 or 105 via receptacle 108. Power source(s) 114 may receive power via interface port 110 for replenishing the battery(ies) and/or capacitor(s) contained therein.

Wireless transceiver(s) 112 can be used to wirelessly transmit and/or receive audio data to or from audio portable audio device 104 or 105 via wireless transceiver(s) 124. As disclosed herein, case 100 can couple to an audio source 102 via adapter 122 to receive audio signal(s) from audio source 102. These audio signal(s) can be encoded or reformatted, via processor(s) 116 and/or mode-specific circuitry 118, for wireless transfer via wireless transceiver(s) 112 to portable audio device 104 or 105 to be output as audio to a user of portable audio device 104 or 105. For example, adapter 122 can couple case 100 to an analog audio source. Analog audio received from the analog audio source can be sampled and encoded into digital audio using processor(s) 116 and/or a digital signal processor (DSP) of mode-specific circuitry 118. The resulting digital audio data can be broadcast via transceiver(s) 112, and thus case 100 can be used as a wireless analog interface to an analog audio source (such as audio source 102).

As disclosed herein, processor(s) 116 can be used in conjunction with mode-specific circuitry 118 to optimize overall power consumption of case 100 (and/or from power source 114) when interfacing with different audio sources. For example, mode-specific circuitry 118 may be activated and/or enter a state where relatively more power is consumed by case 100. As an example, mode-specific circuitry 118 can include a DSP only used to sample analog audio. In regular operation, case 100 may not process analog audio (or any audio) at all. Thus, mode-specific circuitry 118 may only be activated as required to support a certain type of audio source 102, such as an analog audio source. In certain embodiments, mode-specific circuitry 118 may include an analog audio processor that may only be activated when a supported audio source 102 (or respective adapter 122) is detected as being coupled to case 100. Mode-specific circuitry 118 may be physically located in various configurations. For example, mode-specific circuitry 118 can be physically located in distinct and separate electronic component(s) from processor(s) 116, on the same die, or in any combination.

Mode-specific circuitry 118 can include circuitry for processing a selected number of audio channels of audio that may be selectively powered on as needed, generating virtual audio source data to support virtual multipoint audio or support bidirectional or switching unidirectional audio channels when needed to support wireless communications, for example. In certain embodiments, mode-specific circuitry 118 can be used to process ancillary data independent to audio streaming data received from audio source 102. For example, the ancillary data can be used to generate virtual point sources, relay text message data from a cellular phone (which may be interfaced with using wireless transceiver(s) 112 while communicating wirelessly with portable audio device 104), provide haptic data for a corresponding haptic generator of audio device 104 (not shown), or other.

Mode-specific circuitry 118 may be powered (or directed to a high-power state) in response to detection of a specific adapter (such as adapter 122) being connected to interface port 110, to reception of a specific type of signal from a corresponding audio source, etc. For example, when an adapter configured to receive power from an analog audio source is coupled to interface port 110, mode-specific circuitry 118 may be powered on that supports processing of analog audio signals that would otherwise not be needed. Wireless transceiver 112 may also be used to send a command to audio device 104 for a message to be generated to inform a user of the connection of the analog audio adapter (via audio, lighting, haptics, etc.).

Continuing the example use of the analog audio input, when analog mode-specific circuitry is powered and used to detect that an analog audio source is being received via a corresponding adapter at interface port 110, then a command can be sent, via wireless transceiver 112), to audio device 104 to switch audio output via audio driver(s) 126 to correspond to analog audio output by the analog audio source. Thus, when audio is received from an analog type of audio source, audio device 104 can automatically switch audio output from an existing wireless audio source to receive wireless audio from case 100 (and the analog audio source). As disclosed herein, mode-specific circuitry 118 may be used to sample the analog audio and convert it to a digital format for transmissions via transceiver 112.

Similarly, mode-specific circuitry 118 may include wireless transceiver(s) 112, enabling one or more transceivers 112 to be powered selectively and/or when necessary. For example, transceiver(s) 112 can each correspond to a respective wireless audio protocol that may not be supported directly by audio device 104. For example, transceiver(s) 124 may only support a short-range wireless protocol due to power and/or packaging constraints of the audio device (e.g., wireless earbud) 104. Case 100 can include wireless transceiver(s) 112 that can support multiple protocols, longer-ranged communications, and/or more feature-rich communications. Transceiver(s) 124 may interact with an adapter 122 and may be included therein. Thus, an adapter may be used to extend wireless functionality of case 100.

In certain embodiments, mode-specific circuitry 118 may include an analog Compression/Decompression Module (CODEC), a configurable digital CODEC, and/or a configurable radio module. Each of these modules may be implemented via a fixed-function hardware that may be a stand-alone integrated circuit or part of a larger integrated circuitry within case 100. In certain embodiments, the module(s) may be implemented via general-purpose processor(s) that are configured via computer-readable instructions. The analog CODEC may convert analog audio into a digital format for processing by the configurable digital CODEC. Note that each of the modules may be multiple channels that may also be activated depending on an operational state of case 100. Therefore, an additional or different digital channel of the configurable digital CODEC may be activated to accommodate use of the analog CODEC. The configurable digital CODEC may include one or more Bluetooth CODECs (A2DP, AAC, HFP, APTx, SBC, etc.), a high-quality CODEC (e.g., higher bit width and/or sampling rate), a low-latency CODEC, or other custom CODEC(s). The configurable radio module may include Bluetooth Classic; Bluetooth Low Energy; a custom/proprietary ISM (industrial, scientific and medical) band radio; and/or other radio(s).

Figure 2:
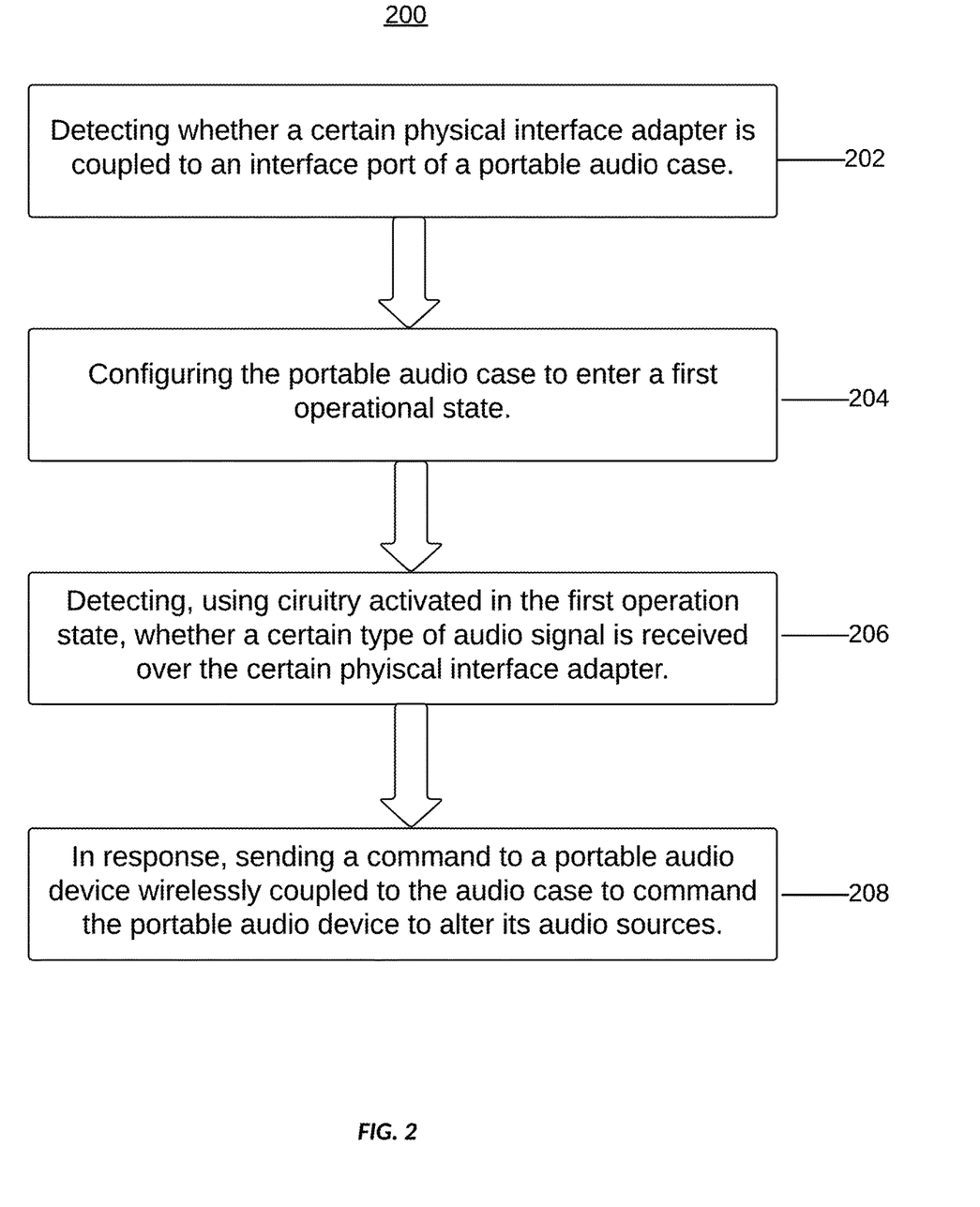
FIG. 2 shows an example flowchart illustrating certain techniques of the disclosure regarding detecting certain types of audio adapters.

FIG. 2 illustrates example flowchart 200 which includes features of the disclosure. At 202, processor(s) 116 may detect whether a certain physical interface adapter is coupled to interface port 110 of portable audio case 100. For example, processor(s) 116 may communicate with the adapter using an interrogation technique wherein a certain signal is transmitted to the adapter and a corresponding signal is received at case 100. In certain embodiments, a pull-up or pull-down resistor can be used wherein a certain voltage is applied to the adapter that is pulled up or down to a certain voltage level by a Zener diode or resistor contained therein, for example. In certain embodiments, the adapter can wirelessly transmit an identification code to case 100 in response to being powered, for example. In certain embodiments, the adapter can include an NFC chip that can be interrogated by portable audio case 100 for identification of the adapter.

At 204, in response to detecting that the certain physical interface adapter is coupled to interface port 110, processor(s) 116 may cause case 100 to enter a first operational state. While in the first operational state, mode-specific circuitry 118 may be activated, which may cause a relatively higher steady-state power draw by case 100 from power source(s) 114. As disclosed herein, mode-specific circuitry 118 may be dormant or in an idle state when the case is not in the first operational state. Mode-specific circuitry 118, when powered, may enable functionality to support use of a certain physical interface adapter. For example, circuitry to support analog audio processing, higher bandwidth audio processing, higher sampling rates, or additional wireless protocols or channels may be enabled.

The following is a non-exclusive list of adapters and corresponding mode-specific circuits that may be activated in response to detecting that the adapter has been coupled to the case.

An analog audio adapter: An analog audio adapter can be coupled to interface port 110 to couple case 100 to an analog audio source. The analog audio source can provide an analog audio signal via a 2.5 mm or 3.5 mm TRS (tip, ring sleeve), DIN (Deutsches Institut für Normung), BNC (Bayonet Neill-Concelman), XLR (External Line Return), RCA (Radio Corporation of America) interface. Mode-specific circuitry 118 can include, for example, an analog to digital converter, as well as digital signal processor, a preamplifier, a filter circuit, or the like to support analog signal processing.

A wireless audio adapter: A wireless adapter can be used that may extend capabilities of an audio system. For example, the wireless adapter may support greater range and/or different wireless protocols than wireless transceiver(s) 124 of audio device 104 and/or wireless transceiver(s) 112 of case 100. The additional protocols may require use of a larger antenna structure, different frequency range, or greater power, and/or have been developed after the release of case 100. Utilizing such an adapter, case 100 can become a relay. In response to detecting that such an adapter is used, mode-specific circuitry 118 can include one or more digital audio interfaces which may, for example, support higher a higher bit width, lower latency, sampling rate, protocol, etc. In addition, the mode-specific circuitry 118 may provide functionality to alter a wireless protocol used between case 100 and audio device 104 to an enhanced protocol. The protocol may be used to support the higher bit width (e.g., 24 bits versus a nominal 16 bits), lower latency, sampling rate, protocol, etc., but this protocol may differ from a protocol used by the wireless audio adapter to communicate with a source device. The enhanced protocol used between case 100 and audio device 104 may require additional processing resources, power usage, etc.

A physical digital audio adapter: This adapter can enable case 100 to appear as an external digital audio device to a host computer device. For example, the digital audio adapter can couple case 100, via interface port 110, to a digital port of a host computing device. The digital port can be a Universal Serial Bus (USB), FireWire, high definition media interface (HDMI), or a similar port. The digital audio adapter can be used to determine capabilities and/or functionalities of the host computer device. For example, the host computer device may support audio encoded at a high bit width and/or at a high sampling rate, which may require use of mode-specific circuitry 118 as disclosed herein. Mode-specific circuitry 118 may also be used to communicate with a host computer device via a specific one type of digital audio adapter. For example, a different type of digital audio adapter can be used respectively for each of USB, firewire, or HDMI digital interface. Mode-specific circuitry 118 may be powered on when an HDMI adapter is detected as being coupled to interface port 110 to enable case 100 to receive audio data via an HDMI interface of a host computer device, for example. In certain embodiments, mode-specific circuitry 118 can include circuitry to present case 100 as an external audio device to a host computer device. For example, case 100 may appear as a digital audio device to a host computer via a USB interface that the host computer could use to route audio to. In this way, case 100 may appear as an external sound card to a host computer device.

An optical adapter: An optical adapter may receive an optical audio signal via a Toshiba Link (TOSLINK) or similar cable. Such an adapter (or any adapter) may be powered via power source(s) 114. Mode-specific circuitry 118 may include optical receivers, or the optical receivers may be embedded into the optical adapter. Mode-specific circuitry 118 may include the enhanced protocol disclosed herein for interface with the optical adapter to enable enhanced audio protocols or the like.

A short-range communications adapter: A short-range communications adapter may include an antenna and/or circuitry to enable a user of case 100 to communicate with like cases with respective like short-range communications adapters. The short-range communications adapter can be used to change case 100 to operate as a walkie-talkie-type device wherein a user can transmit and/or receive wireless audio commands to others proximately located. This may use a radio frequency (RF) outside of the 2.4 GHz ISM band, a Bluetooth radio, or other. Mode-specific circuitry 118 may include circuitry to receive (in addition to transmit) audio data via an analog and/or digital format in any combination.

At 206, a certain type of audio signal can be detected as being received over the certain physical interface adapter. As disclosed herein, although mode-specific circuitry 118 may be active, it may not be desirable to change the source of audio output by a corresponding audio device. For example, the audio device may be a wireless headphone or earbud device that may be receiving audio using its internal wireless transceiver. For example, the audio device can be a wireless earbud system that is coupled to a smartphone and receiving audio data therefrom. When the certain physical interface adapter is attached to the case, the mode-specific circuitry may be activated to support the adapter's functionality. As an example, the adapter may support analog input from a 3.5 mm audio jack. Even though the adapter may be plugged into the case, it may not be desirable for the audio output of the audio device to be changed to receive audio from the smartphone until an active audio signal is detected by the mode-specific circuitry. The detection of such a signal may trigger further changes to the operational state of the case.

At 208, one such change to the operational state can include sending a command to the portable audio device 104 from the case 100 to inform that portable audio device that an active audio signal has been received by the case 100 from the certain physical interface adapter. For example, the command may be received by the portable audio device 104 and, in response, audio output by the audio device 104 may be switched from being sourced from a first device to the audio signal received over the certain physical interface adapter. For example, in reference to the above regarding the wireless earbud system and the smartphone, the wireless earbud system may change its input from the smartphone to the wireless signal received from the case (and ultimately from the analog audio received over the 3.5 mm jack). Other examples could include the command causing the audio device to mix together two audio signals (each from a respective different source), alter the volume of one or more sources, modify an equalization profile for one or more sources, or cause the portable audio device 104 to enter a higher power state to support higher bandwidth or higher sampling rate audio or to support enhanced wireless communications (e.g., additional channels, a different protocol, higher bandwidth, etc.).

In certain embodiments, the change to the operational state may include changing a control schema used by an audio device, such as audio device 104. Audio device 104 can include input element(s) 128 which may include electromechanical, capacitive, or other features that accept control commands from a user. For example, audio device 104 may be an earbud with a button located on its exterior that may be actuated by a user. The audio device may be one of a pair of earbuds, headphones, etc., with each having its own set of input element(s) 128. Input element(s) 128 commands may be adapted depending on an operational mode of case 100 and audio device 104. As one example, an input element may be actuated to activate a digital assistant on a smartphone coupled to audio device 104 via a Bluetooth interface. When case 100 changes operating modes in response to detecting an analog audio signal via a corresponding adapter, for example, the same input element may be actuated by a user to mute the source and/or to change sources. Another example is that input element(s) 128 may be adapted for use with a short-range communications adapter, as disclosed herein. Input element(s) 128 may be adapted to enable selection of another user to communicate with, to switch between receiving and transmitting modes, etc.

Figure 3:
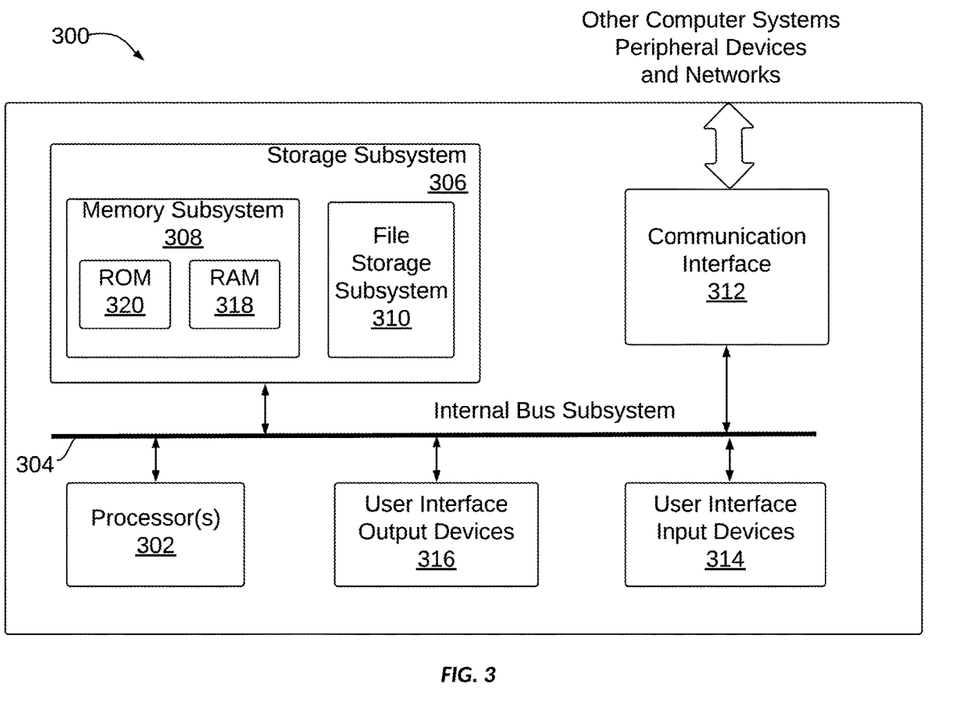
FIG. 3 depicts a block diagram of an embodiment of a computer system.

FIG. 3 is a simplified block diagram of a computing device 300 that is an example of a portable audio device or a portable audio case as disclosed herein. Computing device 300 can implement some or all functions, behaviors, and/or capabilities described above that would use electronic storage or processing, as well as other functions, behaviors, or capabilities not expressly described. Computing device 300 includes a processing subsystem ("processor(s)") 302, a storage subsystem 304, a user interface 306, and/or a communication interface 308. Computing device 300 can also include other components (not explicitly shown), such as a battery, power controllers, and other components operable to provide various enhanced capabilities. In various embodiments, computing device 300 can be implemented on a desktop or laptop computer, mobile device (e.g., tablet computer, smartphone, mobile phone), wearable device, media device, application-specific integrated circuits (ASICs), digital signal processors (DSPs), digital signal processing devices (DSPDs), programmable logic devices (PLDs), field-programmable gate arrays (FPGAs), processors, controllers, microcontrollers, microprocessors, or electronic units designed to perform a function or combination of functions described above.

Storage subsystem 306 can be implemented using a local storage and/or removable storage medium, for example using a disk, flash memory (e.g., secure digital card, USB flash drive), or any other non-transitory storage medium, or a combination of media, and can include volatile and/or nonvolatile storage media. Local storage can include random access memory (RAM), including dynamic RAM (DRAM), static RAM (SRAM), or battery-backed up RAM. In some embodiments, storage subsystem 306 can store one or more applications and/or operating system programs to be executed by processing subsystem 302, including programs to implement some or all operations described above that would be performed using a computer. For example, storage subsystem 306 can store one or more code modules (e.g., stored in file storage subsystem 310) for implementing one or more method steps described above.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long-term, short-term, volatile, nonvolatile, or other storage medium and is not to be limited to any particular type of memory or number of memories or type of media upon which memory is stored.

Moreover, the terms "storage medium" and "storage device" may represent one or more memories for storing data, including read-only memory (ROM), RAM, magnetic RAM (MRAM), core memory, magnetic disk storage mediums, optical storage mediums, flash memory devices, and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium, such as a storage medium. A code segment (e.g., code module stored in file storage subsystem 310) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means, including memory sharing, message passing, token passing, or network transmission, etc.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more ASICs, DSPs, DSPDs, PLDs, FPGAs, processors, controllers, microcontrollers, microprocessors, other electronic units designed to perform the functions described above, and/or a combination thereof.

Each code module 310 may comprise sets of instructions (codes) embodied on a computer-readable medium that directs a processor of a computing device 300 to perform corresponding actions. The instructions may be configured to run in sequential order, in parallel (such as under different processing threads), or in a combination thereof. After loading a code module on a general-purpose computer system, the general-purpose computer is transformed into a special-purpose computer system.

Computer programs incorporating various features described herein (e.g., in one or more code modules may be encoded and stored on various computer-readable storage media. Computer-readable media encoded with the program code may be packaged with a compatible electronic device, or the program code may be provided separately from electronic devices (e.g., via Internet download or as a separately packaged computer-readable storage medium). Storage subsystem 306 can also store information useful for establishing network connections using the communication interface 312.

User interface input devices 314 can include input devices such as a touch pad, touch screen, scroll wheel, click wheel, dial, button, switch, keypad, microphone, etc., together with supporting electronics (e.g., digital-to-analog or analog-to-digital converters, signal processors, etc.). User interface output devices 316 can include a video screen, indicator lights, speakers, headphone jacks, virtual- or augmented-reality display, etc., together with supporting electronics. A user can operate input devices of user interface input devices 314 and/or user interface output devices 316 to invoke the functionality of computer device 300 and can view and/or hear output from computer device 300 via output devices of user interface 306. For some embodiments, the user interface(s) 314, 316 might not be present (e.g., for a process using an ASIC).

Processing subsystem 302 can be implemented as one or more processors (e.g., integrated circuits, one or more single-core or multi-core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 306. Through programming, processing subsystem 302 can provide various functionality for computing device 300. Processing subsystem 302 can also execute other programs to control other functions of computing device 300, including programs that may be stored in storage subsystem 306.

Communication interface 312 can provide voice and/or data communication capability for computing device 300. In some embodiments, communication interface 312 can include radio frequency (RF) transceiver components for accessing wireless data networks (e.g., Wi-Fi network, 3G, 4G/LTE; etc.), mobile communication technologies, components for short-range wireless communication (e.g., using Bluetooth communication standards, NFC, etc.), other components, or combinations of technologies. In some embodiments, communication interface 312 can provide wired connectivity (e.g., universal serial bus, Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently. In some embodiments, the communication interface 312 is not used.

It will be appreciated that computing device 300 is illustrative and that variations and modifications are possible. A computing device can have various functionality not specifically described (e.g., voice communication via cellular telephone networks) and can include components appropriate to such functionality.

Further, while the computing device 300 is described with reference to particular blocks, it is to be understood that these blocks are defined for convenience of description and are not intended to imply a particular physical arrangement of component parts. For example, the processing subsystem 502, the storage subsystem, the user interfaces 514, 516, and/or the communication interface 512 can be in one device or distributed among multiple devices.

Further, the blocks need not correspond to physically distinct components. Blocks can be configured to perform various operations (e.g., by programming a processor or providing appropriate control circuitry), and various blocks might or might not be reconfigurable depending on how an initial configuration is obtained. Embodiments of the present invention can be realized in a variety of apparatus, including electronic devices, implemented using a combination of circuitry and software. Electronic devices described herein can be implemented using computing device 300.

Various features described herein (e.g., methods, apparatus, computer-readable media, and the like) can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications as to enable others skilled in the art to utilize the invention in various embodiments and with various modifications, as are suited to a particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but it could have additional steps not included in the figure. A process may correspond to a method, a function, a procedure, a subroutine, a subprogram, etc.

A recitation of "a," "an," or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A system comprising:
   a portable audio device, including:
      a first housing;
      a transducer coupled to the first housing;
      a first power storage element coupled to the first housing;
      a first wireless transceiver coupled to the first housing;
      a first one or more processors coupled to the transducer, the power storage element, the first wireless transceiver, and the first housing, the one or more processors configured to receive a wireless transmission via the first wireless transceiver and output soundwaves via the transducer corresponding to the wireless transmission;
   a plurality of different physical interface adapters, each configured to couple to a respective one of a plurality of different types of audio sources;
   a portable audio case, including:
      a housing including one or more receptacles configured to physically receive and couple to the portable audio device;
      a second power storage element coupled to the housing;
      an interface port coupled to the housing, the interface port configured to couple the portable audio case to each of the plurality of different physical interface adapters;
      mode-specific circuitry coupled to the housing and the interface port, the mode-specific circuitry including an analog audio processor;
      a second wireless transceiver coupled to the housing and the interface port;
      a second one or more processors coupled to the housing, the second power storage element, the interface port, and the second wireless transceiver, the second one or more processors configured to:
         detect that a certain one of the plurality of different physical interface adapters is coupled to the interface port;
         in response to detecting that the certain physical interface adapter is coupled to the interface port, configure the case to enter a first operational state wherein the mode-specific circuitry either is powered on or enters a high-power state to support receiving an audio signal via the certain physical interface adapters, and wherein, if the certain physical interface adapter connects to a digital audio source, deactivating the analog audio processor but activating portions of the mode-specific circuitry required to support the digital audio source;
         detect, using the mode-specific circuitry, that an audio signal is received from one of the plurality of different types of audio sources via the certain physical interface adapter;
         in response to detecting that the audio signal is received from one of the plurality of different types of audio sources via the certain physical interface adapter, send a command, via the second wireless transceiver to the first wireless transceiver;
      wherein, in response to receiving the command, the first one or more processors receive streaming audio via the first wireless transceiver from the second wireless transceiver, the streaming audio corresponding to the audio signal and output of a corresponding soundwave via the transducer.

2. A portable audio case, comprising:
   a housing including one or more receptacles configured to physically receive and couple to one or more portable audio devices;
   a power storage element coupled to the housing;
   an interface port coupled to the housing, the interface port configured to couple the portable audio case to a plurality of audio sources via a respective different physical interface adapter;
   a transmitter coupled to the housing and the interface port;
   mode-specific circuitry coupled to the housing and the interface port, the mode-specific circuitry including an analog audio processor;
   one or more processors coupled to the housing, the power storage element, the interface port, and the transmitter, the one or more processors configured to:
      detect whether a certain physical interface adapter is coupled to the interface port to receive an audio signal from a certain type of audio source of the plurality of audio sources;
      in response to detecting that the certain physical interface adapter is coupled to the interface port, configure the case to enter a first operational state wherein mode-specific circuitry is enabled and supports:
         if the certain physical interface adapter connects to a digital audio source, deactivating the analog audio processor but activating portions of the mode-specific circuitry required to support the digital audio source;
         receiving the audio signal from the certain type of audio source; and
         wirelessly transmitting audio data via the transmitter wherein the audio data corresponds to the audio signal.

3. The portable audio case of claim 2 wherein the first operational state includes an increased steady-state power consumption rate from the power storage element to support receiving the audio signal and transmitting the audio data.

4. The portable audio case of claim 3 wherein the first operational state includes powering digital signal processing circuitry of the one or more processors, the signal processing circuitry configured to support processing of the audio signal.

5. The portable audio case of claim 3 wherein the first operational state includes powering circuitry configured to receive audio at a higher bit width and/or a higher sampling rate than the portable audio case would be able to receive if the circuitry were not powered, such that the powering circuitry receives power in the first operational state but not in another operational states.

6. The portable audio case of claim 2 wherein the audio signal is an analog audio signal and the audio data is digitally encoded.

7. The portable audio case of claim 2 wherein the one or more processors are further configured to support a second operational state in response to the one or more processors detecting that the audio signal is being received from the certain type of audio source.

8. The portable audio case of claim 7 wherein the second operational state includes remapping one or more input elements of a portable audio device coupled to the portable audio case.

9. The portable audio case of claim 7 wherein the second operational state includes sending a command to a portable audio device coupled to the portable audio case wherein the command configures the portable audio device to receive the audio data wirelessly transmitted from the portable audio case.

10. The portable audio case of claim 7 wherein:
the first operational state includes an increased steady-state power consumption rate from the power storage element to support receiving the audio signal and transmitting the audio data; and
the second operational state includes sending a first command, via the transmitter, the first command configured to cause the one or more portable audio devices to switch audio output of the one or more portable audio devices to correspond to the audio signal received from the certain type of audio source.

11. The portable audio case of claim 7 wherein the second operational state includes sending a second command, via the transmitter, the second command configured to cause the one or more portable audio devices to receive wireless audio streaming data from the wireless transmitter of the case from a different wireless transmitter.

12. A method of operating a portable audio case, comprising:
detecting, by one or more processors of the portable audio case, whether a certain physical interface adapter is coupled to an interface port of the portable audio case, the physical interface adapter coupled to receive an audio signal from a certain type of audio source, wherein the audio source is one of a plurality of audio sources, each corresponding to a respective different physical interface adapter;
in response to detecting that the certain physical interface adapter is coupled to the interface port, configuring the portable audio case to enter a first operational state wherein mode-specific circuitry is enabled that supports:
if the certain physical interface adapter connects to a digital audio source, deactivating an analog audio processor but activating portions of the mode-specific circuitry required to support the digital audio source;
receiving the audio signal from the certain type of audio source; and
wirelessly transmitting audio data via a wireless transmitter of the portable audio case, wherein the audio data corresponds to the audio signal,
wherein the first operational state includes an increased steady-state power consumption rate from the power storage element to support receiving the audio signal and transmitting the audio data.

13. The method of operating a portable audio case of claim 12 wherein the first operational state includes powering digital signal processing circuitry of the one or more processors, the signal processing circuitry configured to support processing of the audio signal.

14. The method of operating a portable audio case of claim 12 wherein the first operational state includes powering circuitry configured to receive audio at a higher bit width and/or a higher sampling rate than the portable audio case would be able to receive if the circuitry were not powered, such that the powering circuitry receives power in the first operational state but not in another operational states.

15. The method of operating a portable audio case of claim 12 wherein the audio signal is an analog audio signal and the audio data is digitally encoded.

16. The method of operating a portable audio case of claim 12, further comprising supporting a second operational state in response to the one or more processors detecting that the audio signal is being received from the certain type of audio source.

17. The method of operating a portable audio case of claim 16 wherein the second operational state includes remapping one or more input elements of a portable audio device coupled to the portable audio case.

18. The method of operating a portable audio case of claim 16 wherein the second operational state includes sending a command to a portable audio device coupled to the portable audio case, wherein the command configures the portable audio device to receive the audio data wirelessly transmitted from the portable audio case.

19. The method of operating a portable audio case of claim 16 wherein:
the first operational state includes the increased steady-state power consumption rate from the power storage element to support receiving the audio signal and transmitting the audio data; and
the second operational state includes sending a first command, via the transmitter, the first command configured to cause one or more portable audio devices to switch audio output by the one or more portable audio devices to correspond to the audio signal received from the certain type of audio source.

* * * * *